United States Patent [19]

Hinze

[11] 4,265,783

[45] May 5, 1981

[54] STABILIZATION OF POLYETHER POLYOLS AND POLYURETHANE FOAMS PREPARED THEREFROM

[75] Inventor: Kenneth J. Hinze, Lake Jackson, Tex.

[73] Assignee: The Dow Chemical Company, Midland, Mich.

[21] Appl. No.: 141,853

[22] Filed: Apr. 21, 1980

[51] Int. Cl.$^3$ ............................................. C08G 18/14
[52] U.S. Cl. .................................... 252/182; 521/117; 521/121; 521/128; 521/130
[58] Field of Search ................ 252/182; 521/117, 121, 521/128, 130

[56] References Cited

U.S. PATENT DOCUMENTS

| | | | |
|---|---|---|---|
| 3,072,605 | 1/1963 | Rogers et al. | 260/45.95 |
| 3,214,397 | 10/1965 | Cox | 260/45.8 |
| 3,428,567 | 2/1969 | Newton | 252/188.3 |
| 3,567,664 | 3/1971 | Haring | 521/128 |
| 3,637,865 | 1/1972 | Haring | 521/128 |
| 4,007,230 | 2/1977 | Hinze | 536/120 |
| 4,010,211 | 3/1977 | Preston et al. | 260/45.8 R |
| 4,021,385 | 5/1977 | Austin et al. | 260/45.9 QB |
| 4,070,304 | 1/1978 | Hinze | 252/404 |
| 4,143,219 | 3/1979 | Hensch | 521/107 |
| 4,146,687 | 3/1979 | Reale | 521/107 |

*Primary Examiner*—Maurice J. Welsh
*Attorney, Agent, or Firm*—J. G. Carter

[57] ABSTRACT

Polyols stabilized against oxidative degradation with a synergistic combination of a sterically hindered phenol and 4,4'-bis($\alpha,\alpha$-dimethylbenzyl)diphenyl amine are improved by replacing a portion of either the phenol or the amine or a portion of both with a phenothiazine compound.

9 Claims, No Drawings

STABILIZATION OF POLYETHER POLYOLS AND POLYURETHANE FOAMS PREPARED THEREFROM

BACKGROUND OF THE INVENTION

Antioxidants for polyether polyols and polyurethane foams prepared therefrom are well known and include hindered phenols, phenothiazines, mixtures of hindered phenols with phenothiazines or phosphoric acid, mixtures of 2,6-ditertiarybutyl-4-methyl phenol and a dialkyldiphenyl amine, mixtures of a hindered phenol and 4,4'-bis($\alpha$,$\alpha$-dimethylbenzyl)diphenyl amine and mixtures of 2,6-ditertiarybutyl-4-methyl phenol, p,p'-dioctyl diphenyl amine and a phenothiazine.

Because of fluctuation and/or availability of the component materials it is desirable to find ways to decrease the quantity of antioxidant necessary to effectively stabilize the polyol and polyurethane against oxidative degradation and the foams prepared therefrom from scorching.

It has now been unexpectedly discovered that polyether polyols stabilized with a synergistic combination of certain hindered phenols and 4,4'-bis($\alpha$,$\alpha$-dimethylbenzyl) diphenyl amine with a phenothiazine compound. The improvement is greater stability to the polyol against oxidative degradation at the same level of antioxidant or reduced levels of antioxidant for the same amount of stability.

SUMMARY OF THE INVENTION

One aspect of the present invention is directed to an improvement in a polyether polyol or mixture of polyether polyols stabilized against oxidative degradations with a stabilizing quantity of a synergistic composition containing
  (A) from about 15 to about 85, preferably from about 25 to about 75 percent by weight of a sterically hindered phenolic antioxidant and
  (B) from about 85 to about 15 and preferably from about 75 to about 25 percent by weight of 4,4'-bis-($\alpha$,$\alpha$-dimethylbenzyl)diphenyl amine,
the improvement which comprises substituting for part of either component (A) or (B) or a part of each of components (A) and (B), from about 25 to about 1000, preferably from about 50 to about 500 parts per million parts of polyether polyol of a phenothiazine compound represented by the formula

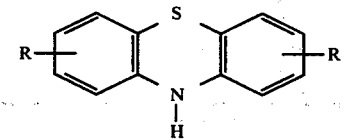

wherein each R is independently hydrogen or an alkyl group having from 1 to about 12 carbon atoms.

The present invention also pertains to polyurethane foams prepared from the aformentioned polyether polyol.

DETAILED DESCRIPTION OF THE PREFERRED EMBODIMENTS

Suitable sterically hindered phenolic antioxidant compounds which can be employed herein include, for example, 2,4-dimethyl-6-octyl phenol,
2,6-ditertiarybutyl-4-methyl phenol,
2,6-ditertiarybutyl-4-ethyl phenol,
2,6-ditertiarybutyl-4-n-butyl phenol,
2,2'-methylene bis(4-methyl-6-tertiarybutyl phenol),
2,2'-methylene bis(4-ethyl-6-tertiarybutyl-phenol),
2,4-dimethyl-6-tertiarybutyl phenol,
4-hydroxymethyl-2,6-ditertiarybutyl phenol,
n-octadecyl-beta (3,5-ditertiarybutyl-4-hydroxyphenyl) propionate, mixtures thereof and the like.

Particularly suitable phenothiazine compounds which can be employed herein include, for example, phenothiazine, 2-methylphenothiazine, 3-octylphenothiazine, 2,8-dimethylphenothiazine, 3,7-dimethylphenothiazine, 3,7-diethylphenothiazine, 3,7-dibutylphenothiazine, 3,7-dioctylphenothiazne, 2,8-dioctylphenothiazine, mixtures thereof and the like.

The polyether polyols which can be stabilized with the antioxidant composition of the present invention include those having from 2 to about 8 OH groups. Such polyols are disclosed by and methods for their preparation are given in *POLYURETHANES: CHEMISTRY AND TECHNOLOGY II. TECHNOLOGY* by Saunders and Frisch, Interscience Publishers, 1964. Also described therein are polyurethane foams and methods for their preparation.

Particularly suitable polyether polyols include those prepared by reacting an initiator compound having 2 to about 8 hydroxyl groups with an alkylene oxide or mixtures of such oxides, said polyols having molecular weights of from about 250 to about 10,000, preferably from about 2,000 to about 8,000.

Suitable initiator compounds include, for example, ethylene glycol, propylene glycol, water, butane diol, hexane diol, glycerine, trimethylol propane, hexane triol, penaerythritol, sucrose, mixtures thereof and the like.

Suitable alkylene oxides include, for example, 1,2-propylene oxide, ethylene oxide, 1,2-butylene oxide, 2,3-butylene oxide, styrene oxide, epichlorohydrin, epibromohydrin, mixtures thereof and the like.

The synergistic antioxidant compositions are employed in quantities of at least 10 parts per million (ppm) based upon the polyether polyol, preferably from about 500 to about 100,000, most preferably from about 1500 to about 5,000 ppm.

The following examples are illustrative of the present invention but are not to be construed so as to limit the scope thereof in any manner.

The stability of the polyols containing the various antioxidant systems was determined by placing the samples in a DuPont differential scanning calorimeter, Model 990 Thermal Analyzer and Module, at the indicated temperature and the induction period (time to initiation of oxidative decomposition) was recorded.

In the stability determination, the polyol samples weighing 10 mg±0.2 mg were placed in an aluminum pan containing a disc of 100 mesh stainless steel wire screen in the bottom of the pan. The aluminum pan containing the sample to be tested was placed in a differential scanning calorimeter cell along with a reference pan containing only the wire screen. The differential scanning calorimeter cell was purged with nitrogen for five minutes after it was closed. The cell was brought up to the isothermal temperature as quickly as possible without overshooting the desired temperature, usually 3 to 4 minutes. When the desired temperature was reached, the nitrogen was turned off and oxygen was introduced into the cell. When the oxygen flow rate reached 50 cc/minute, the recorder was started. Time was recorded on the X axis of the recorder, the temperature profile of the run was recorded on the Y axis, and the energy emitted or absorbed by the sample was recorded on the Y' axis. The induction period (time between introduction of oxygen into the cell and the time of initiation of oxidative decomposition) was determined by locating the point of interception of the baseline (X axis) and the slope of the exotherm deflection (Y' axis). The longer the induction period of the sample, the more stable was the sample.

EXAMPLE 1

Various levels of 2,6-ditertiarybutyl-4-methyl phenol, 4,4'-bis($\alpha,\alpha$-dimethylbenzyl)diphenyl amine and phenothiazine were employed to stabilize a polyether polyol against oxidative degradation. The polyol employed was the reaction product of a mixture 92 wt. percent propylene oxide and 8 wt. percent ethylene oxide with a glycerine-propylene oxide reaction product having a molecular weight of about 450, the resultant polyol having a molecular weight of about 3000 hereinafter designated as polyol A.

Resistance to foam scorch was determined by preparing low density flexible foam with the polyols containing the various antioxidant systems and then subjecting these foams to a scorch test. The foams were prepared by a one-shot process using the following formulation:

| | |
|---|---|
| (1) 3000 molecular weight polyether polyol A | 200 grams |
| (2) Water | 10.4 grams |
| (3) L-540 Silicone surfactant | 2.4 grams |
| (4) Niax A-6 Amine Catalyst | 0.250 grams |
| (5) T-9 Stannous octoate | 0.300, 0.350, or 0.400 grams |
| (6) 80/20 mixture of 2,4-2,6-toluene diisocyanate (120 Index) | 141.9 grams |

The first five components of the formualtion were mixed at 2000 rpm in a one quart Dixie cup for 25 seconds. The toluene diisocyanate was added to the cup and the components were mixed for an additional 5 seconds at 2000 rpm. Immediately after the second mix the formulation was poured into a 10 inch×10 inch×4 inch pastry box. The foam was allowed to rise and at 300 seconds from the start of the second mix the foam bun was placed into a preheated microwave oven for 4 minutes. The microwave oven had been calibrated so that 400 grams of water would increase 44° C. in temperature when heated for 4 minutes. At the end of the microwave cure the foam bun was placed in a conventional air circulating oven, controlled at 100° C., for 30 minutes. The foam buns were then allowed to cure at room temperature for 18 hours.

After a final cure of the foam buns, a one inch thick slice was cut parallel to the rise from the center of each bun. Each foam slice was then placed on a light box and the color of the foam was observed. The breathability (airflow) in the direction of foam rise was measured on a 2 inch×2 inch×1 inch foam sample taken from the center of the remaining portion of the foam bun.

One foam bun was prepared at each of the three stannous octoate levels with each polyol evaluated in the scorch test. The degree of foam scorch is related to the breathability (a relative measure of the open cell content) of the foam which is related to the amount of stannous octoate in the formulation. In this scorch test, the degree of scorch increased with the increased breathability. When the same base polyol is used in the foam formulation equivalent air flow values are obtained at a constant stannous octoate level. Therefore the resistance to scorch was compared at equivalent air flow values. The degree of scorch is also related to the absolute humidity and only the foams made under the same humidity conditions are comparable.

The results of the stability and scorch resistance determination for this example are presented in Table I. In this table "BHT" stands for 2,6-ditertiarybutyl-4-methyl phenol, "DMBDPA" stands for 4,4'-bis($\alpha,\alpha$-dimethylbenzyl)diphenyl amine, "PTZ" stands for phenothiazine, and "I.P." stands for induction period. The foam appearance was rated as follows:

0 White, no discoloration
1 Very slight yellow discoloration
2 Light yellow discoloration
3 Yellow discoloration
4 Yellow to light brown discoloration
5 Yellow brown discoloration
6 Dark yellow brown discoloration
7 Opaque dark brown appearance
8 Charred dark brown with foam deterioration
9 Severe scorch, the foam actually started to smolder

TABLE I

| Sample Number | Antioxidant Level, ppm | | | I.P. at 170° C., min. | Foam Appearance Rating (@ Various T-9 Wts.(gms)[1] | | | Average Appearance Rating |
|---|---|---|---|---|---|---|---|---|
| | BHT | DMBDPA | PTZ | | 0.300 | 0.350 | 0.400 | |
| 1[2] | 3000 | 1500 | — | 22.9 | 5 | 4 | 3 | 4 |
| 2[2] | 2000 | 1000 | — | 15.8 | 9 | 7 | 5 | 7 |
| 3[3] | 1900 | 1000 | 100 | 24.9 | 5 | 4 | 3 | 4 |
| 4[3] | 2000 | 900 | 100 | 27.5 | 5 | 4 | 3 | 4 |
| 5[2] | — | — | 100 | 11.5 | 9 | 9 | 8 | 8.7 |

[1]These foam samples were prepared when the absolute humidity ranged frm 99 to 102 grains of water per pound of dry air.
[2]Comparative Experiment.
[3]Example of the present invention.

EXAMPLE 2

The polyether polyol described in Example 1 was stabilized with 3300 ppm total antioxidant while the amounts of 2,6-ditertiarybutyl-4-methyl phenol, 4,4'-bis($\alpha,\alpha$-dimethylbenzyl)diphenyl amine and phenothiazine in each composition were varied. These polyol samples were then evaluated as described in Example 1 and the data is presented in Table II.

TABLE V

| SAMPLE NUMBER | POLYOL | PHENOLIC ANTIOXIDANT | ANTIOXIDANT LEVEL, ppm | | | I.P. TEMP. °C. | I.P. MIN. |
|---|---|---|---|---|---|---|---|
| | | | PHENOLIC | DMBDPA | PTZ | | |
| 21[1] | B | BHT | 250 | 250 | — | 140 | 19.7 |
| 22[2] | B | BHT | 225 | 250 | 25 | 140 | 47.7 |
| 23[2] | B | BHT | 250 | 225 | 25 | 140 | 32.5 |
| 21[1] | B | BHT | 5000 | 5000 | — | 180 | 19.6 |
| 25[2] | B | BHT | 4500 | 5000 | 500 | 180 | 38.8 |
| 26[2] | B | BHT | 5000 | 4500 | 500 | 180 | 35.7 |
| 27[1] | A | DMOP | 2400 | 1200 | — | 170 | 12.5 |
| 28[2] | A | DMOP | 2325 | 1200 | 75 | 170 | 16.9 |
| 29[2] | A | DMOP | 2400 | 1125 | 75 | 170 | 14.8 |
| 30[2] | A | DMOP | 2250 | 1200 | 150 | 170 | 20.7 |
| 31[2] | A | DMOP | 2400 | 1050 | 150 | 170 | 18.0 |
| 32[1] | B | DMTBP | 1500 | 1500 | — | 170 | 10.9 |
| 33[2] | B | DMTBP | 1400 | 1500 | 100 | 170 | 17.3 |
| 34[2] | B | DMTBP | 1500 | 1400 | 100 | 170 | 19.4 |
| 35[1] | B | MBMTBP | 1000 | 1000 | — | 170 | 12.9 |
| 36[2] | B | MBMTBP | 900 | 1000 | 100 | 170 | 20.1 |
| 37[2] | B | MBMTBP | 1000 | 900 | 100 | 170 | 20.8 |
| 38[1] | B | MBETBP | 1500 | 1500 | — | 170 | 14.3 |
| 39[2] | B | MBETBP | 1400 | 1500 | 100 | 170 | 22.5 |
| 40[2] | B | MBETBP | 1500 | 1400 | 100 | 170 | 25.2 |
| 41[1] | B | HDTBP | 1500 | 1500 | — | 170 | 27.2 |
| 42[2] | B | HDTBP | 1400 | 1500 | 100 | 170 | 38.4 |
| 43[2] | B | HDTBP | 1500 | 1400 | 100 | 170 | 41.3 |
| 44[1] | B | ODTBHPP | 1500 | 1500 | — | 170 | 14.6 |
| 45[2] | B | ODTBHPP | 1400 | 1500 | 100 | 170 | 36.5 |
| 46[2] | B | ODTBHPP | 1500 | 1400 | 100 | 170 | 36.5 |

[1]Comparative Experiment
[2]Example of the present invention

I claim:

1. In a polyether polyol or mixture of polyether polyols stabilized against oxidative degradation with a stabilizing quantity of a synergistic antioxidant composition containing (A) from about 15 to about 85 percent by weight of a hindered phenolic antioxidant and (B) from about 85 to about 15 percent by weight of 4,4'-bis($\alpha,\alpha$-dimethylbenzyl)diphenyl amine;

the improvement which comprises replacing a portion of either of the components (A) or (B) or a portion of both of the components (A) and (B) with from about 25 to about 1000 parts per million parts by weight of polyether polyol of a phenothiazine compound represented by the formula

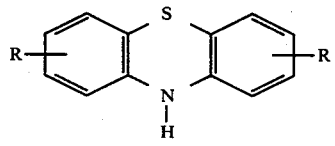

wherein each R is independently hydrogen or an alkyl group having from 1 to about 12 carbon atoms.

2. The improved polyol of claim 1 wherein (a) said synergistic antioxidant composition is employed in a quantity of from about 500 to about 100,000 parts per million parts of polyether polyol;

(b) said synergistic antioxidant composition contains from about 25 to about 75 percent of component (A) and from about 75 to about 25 percent of component (B);

(c) said sterically hindered phenol is selected from the group consisting of
   2,4-dimethyl-6-octyl phenol,
   2,6-ditertiarybutyl-4-methyl phenol,
   2,6-ditertiarybutyl-4-ethyl phenol,
   2,6-ditertiarybutyl-4-n-butyl phenol,
   2,2'-methylene bis(4-methyl-6-tertiarybutyl phenol),
   2,2'-methylene bis(4-ethyl-6-tertiarybutyl phenol),
   2,4-dimethyl-6-tertiarybutyl phenol,
   4-hydroxymethyl-2,6-ditertiarybutyl phenol,
   n-octadecyl-beta(3,5-ditertiarybutyl-4-hydroxyphenyl) propionate, mixtures thereof and the like;

(d) said phenthiazine compound is employed in quantities of from about 50 to about 500 ppm and is selected from the group consisting of phenothiazine, 2-methylphenothiazine, 3-octylphenothiazine, 2,8-dimethylphenothiazine, 3,7-dimethylphenothiazine, 3,7-diethylphenothiazine, 3,7-dibutylphenothiazine, 3,7-dioctylphenothiazine, 2,8-dioctylphenothiazine, and mixtures thereof; and (e) said polyether polyol or mixture of polyether polyols has a weight average molecular weight of from about 2000 to about 10,000.

3. The improved polyol of claim 2 wherein aid sterically hindered phenol is selected from the group consisting of
   2,4-dimethyl-6-octyl phenol,
   2,6-ditertiarybutyl-4-methyl phenol,
   2,6-ditertiarybutyl-4-ethyl phenol,
   2,6-ditertiarybutyl-4-n-butyl phenol,
   2,2'-methylene bis(4-methyl-6-tertiarybutyl phenol),
   2,2'-methylene bis(4-ethyl-6-tertiarybutyl-phenol),
   and mixtures thereof.

4. The improved polyol of claim 3 wherein the polyol has an average functionality of from about 2 to about 4.

5. The improved polyol of claim 4 wherein the polyether polyol is a polyoxyalkylene derivative of a member selected from the group consisting of ethylene glycol, propylene glycol, glycerine, trimethylol propane, pentaerythritol, sucrose and mixtures thereof.

6. The improved polyol of claim 5 wherein the oxyalkylene groups are selected from the group consisting of

TABLE II

| Sample Number | Antioxidant Level, ppm | | | I.P. at 170° C. min. | Foam Appearance Rating @Various T-9 Wts.(gms)[1] | | | Average Appearance Rating |
|---|---|---|---|---|---|---|---|---|
| | BHT | DMBDPA | PTZ | | 0.300 | 0.350 | 0.400 | |
| 6[2] | 2200 | 1100 | — | 14.7 | 9 | 7 | 5 | 7 |
| 7[3] | 2150 | 1100 | 50 | 23.5 | 9 | 5 | 4 | 6 |
| 8[3] | 2200 | 1050 | 50 | 20.6 | 7 | 5 | 3 | 5 |
| 9[3] | 2100 | 1100 | 100 | 28.1 | 5 | 3 | 3 | 3.7 |
| 10[3] | 2200 | 1000 | 100 | 30.1 | 5 | 3 | 3 | 3.7 |

[1] These foam samples were prepared when the absolute humidity ranged from 98 to 103 grains of water per pound of dry air.
[2] Comparative Experiment.
[3] Example of the present invention.

EXAMPLE 3

The polyether polyol described in Example 1 was stabilized with 3000 ppm total antioxidant while the amounts of 2,6-ditertiarybutyl-4-methyl phenol, 4,4'-bis-(α,α-dimethylbenzyl)diphenyl amine and phenothiazine in each composition were varied. These polyol samples were then evaluated as described in Example 1 and the data is presented in Table III.

TABLE III

| Sample Number | Antioxidant Level, ppm | | | I.P. at 170° C., min. | Foam Appearance Rating @ Various T-9 Wts.(gms)[1] | | | Average Appearance Rating |
|---|---|---|---|---|---|---|---|---|
| | BHT | DMBDPA | PTZ | | 0.300 | 0.350 | 0.400 | |
| 11[2] | 1500 | 1500 | — | 14.5 | 9 | 8 | 7 | 8 |
| 12[3] | 1450 | 1500 | 50 | 20.2 | 5 | 7 | 5 | 5.7 |
| 13[3] | 1500 | 1450 | 50 | 23.1 | 5 | 3 | 6 | 4.7 |
| 14[3] | 1400 | 1500 | 100 | 26.8 | 5 | 6 | 3 | 4.7 |
| 15[3] | 1500 | 1400 | 100 | 28.4 | 5 | 3 | 3 | 3.7 |

[1] These foam samples were prepared when the absolute humidity ranged from 66 to 78 grains of water per pound of dry air.
[2] Comparative Experiment.
[3] Example of the present invention.

EXAMPLE 4

The polyether polyol described in Example 1 was stabilized with various amounts of 2,6-ditertiarybutyl-4-n-butyl phenol, 4,4'-bis(α,α-dimethylbenzyl) diphenyl amine, and phenothiazine to demonstrate the utility of this invention while using a different type of hindered phenolic antioxidant. The total stabilizer level was held constant at 3600 ppm. These polyol samples were evaluated as described in Example 1. The data for this example is presented in Table IV where "DTBNBP" stands for 2,6-ditertiarybutyl-4-n-butyl phenol and all other abbreviations are the same as defined in Example 1.

EXAMPLE 5

Various levels of several hindered phenolic antioxidants, 4,4'-bis(α,α-dimethylbenzyl) diphenyl amine and phenothiazine were employed to stabilize either Polyol A or Polyol B. Polyol A was described in Example 1. Polyol B was the reaction product of propylene oxide with a glycerine-propylene oxide reaction product having a molecular weight of about 450, the resultant polyol having a molecular weight of about 3000. The results of the polyol stability determination are presented in Table V. The hindered phenolic antioxidants were abbreviated as follows:

BHT 2,6-ditertiarybutyl-4-methyl phenol
DMOP 2,4-dimethyl-6-octyl phenol
DMTBP 2,4-dimethyl-6-tertiarybutyl phenol
MBMTBP 2,2'-methylene bis(4-methyl-6-tertiarybutyl phenol)
MBETBP 2,2'-methylene bis(4-ethyl-6-tertiarybutyl phenol)
HDTBP 4-hydroxymethyl-2,6-ditertiarybutyl phenol
ODTBHPP n-octadecyl-beta (3,5-ditertiarybutyl-4-hydroxyphenyl) propionate All other appreviations are the same as defined in Example 1.

TABLE IV

| Sample Number | Antioxidant Level, ppm | | | I.P. at 170° C., min. | Foam Appearance Rating @ Various T-9 Wts. (gms)[1] | | | Average Appearance Rating |
|---|---|---|---|---|---|---|---|---|
| | DTBNBP | DMBDPA | PTZ | | 0.300 | 0.350 | 0.400 | |
| 16[2] | 2400 | 1200 | — | 17.0 | 9 | 8 | 5 | 7.3 |
| 17[3] | 2325 | 1200 | 75 | 29.5 | 5 | 4 | 4 | 4.3 |
| 18[3] | 2400 | 1125 | 75 | 27.0 | 5 | 4 | 3 | 4 |
| 19[3] | 2250 | 1200 | 150 | 32.6 | 5 | 4 | 3 | 4 |
| 20[3] | 2400 | 1050 | 150 | 37.2 | 4 | 3 | 3 | 3.3 |

[1] These foam samples were prepared when the absolute humidity ranged from 63 to 69 grains of water per pound of dry air.
[2] Comparative Experiment.
[3] Example of the present invention.

oxypropylene, oxybutylene, oxyethylene and mixtures of any two or more.

7. The improved polyol of claim 6 wherein said polyol is glycerine intiated.

8. The improved polyol of claim 7 wherein the oxyalkylene groups are a mixture of oxyethylene and oxypropylene groups.

9. The improved polyol of claim 8 wherein the sterically hindered phenol is 2,6-ditertiarybutyl-4-methyl phenol and the phenothiazine compound is phenothiazine.

* * * * *

UNITED STATES PATENT AND TRADEMARK OFFICE
CERTIFICATE OF CORRECTION

PATENT NO. : 4,265,783
DATED : May 5, 1981
INVENTOR(S) : Kenneth J. Hinze

It is certified that error appears in the above-identified patent and that said Letters Patent are hereby corrected as shown below:

Column 2, line 18 change "3,7-dioctylphenothiazne" to --3,7-dioctylphenothiazine--.

Column 4, in footnote 1 under Table 1 change "frm" to --from--.

Column 7 & 8 in Table V under the Heading Sample Number line 4 change "$21^1$" to --$24^1$--.

Column 8 line 38 change "phenthiazine" to --pheothiazine--.

Column 8, line 50, claim 3 change "aid" to --said--.

Signed and Sealed this

Twenty-ninth Day of September 1981

[SEAL]

Attest:

GERALD J. MOSSINGHOFF

Attesting Officer

Commissioner of Patents and Trademarks